(12) United States Patent
Breuer et al.

(10) Patent No.: US 6,957,850 B2
(45) Date of Patent: Oct. 25, 2005

(54) SUNSHADE ASSEMBLY FOR USE IN AN OPEN ROOF CONSTRUCTION AND OPEN ROOF CONSTRUCTION PROVIDED WITH SUCH A SUNSHADE ASSEMBLY

(75) Inventors: Roland Willem Breuer, Helmond (NL); Nicholas James Reagan, Arnhem (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 10/788,233

(22) Filed: Feb. 26, 2004

(65) Prior Publication Data

US 2005/0073175 A1 Apr. 7, 2005

(30) Foreign Application Priority Data

Feb. 27, 2003 (EP) .................................. 03075586

(51) Int. Cl.[7] .................................................. B60J 7/00

(52) U.S. Cl. .................. 296/214; 296/219; 296/216.08

(58) Field of Search ........................... 296/214, 216.08, 296/219

(56) References Cited

U.S. PATENT DOCUMENTS

| 1,893,351 | A | * | 1/1933 | Austin ......................... 296/219 |
| 2,210,590 | A | * | 8/1940 | Jobst ....................... 296/107.17 |
| 4,807,921 | A | * | 2/1989 | Champie et al. ............... 296/98 |

FOREIGN PATENT DOCUMENTS

| CH | 473 962 | 6/1969 |
| DE | 196 39 478 A1 | 7/1997 |
| DE | 198 60 826 A1 | 7/2000 |
| EP | 1 112 876 A2 | 7/2001 |
| EP | 1 145 886 A1 | 10/2001 |

* cited by examiner

*Primary Examiner*—Dennis H. Pedder
(74) *Attorney, Agent, or Firm*—Westman, Champlin & Kelly, P.A.; Todd R. Fronek

(57) ABSTRACT

A sunshade assembly for use in an open roof construction for a vehicle includes a flexible sunshade screen that, with its one end, can be wound on or off a spring-loaded winding cylinder and with its other end having a transversally extending pulling beam. The sunshade assembly further includes two spaced, longitudinally extending guides. Both guides are provided with at least partially flexible members having a main body with a substantially U-shaped cross-section. Attached to said main body is a flexible lip to engage the pulling beam and hold it in a desired position.

14 Claims, 2 Drawing Sheets

SUNSHADE ASSEMBLY FOR USE IN AN OPEN ROOF CONSTRUCTION AND OPEN ROOF CONSTRUCTION PROVIDED WITH SUCH A SUNSHADE ASSEMBLY

BACKGROUND OF THE INVENTION

The invention relates firstly to a sunshade assembly for use in an open roof construction for a vehicle, comprising a flexible sunshade screen that, with its one end, can be wound on or off a spring-loaded winding cylinder and that at its other end comprises a transversally extending pulling beam, and further comprising two spaced, longitudinally extending guides each defining a guiding channel for receiving and guiding two opposite lateral ends of the pulling beam and for defining a guiding plane in which the sunshade screen extends, wherein both guides are provided with at least partially flexible members extending along substantially the entire length of the guides and protruding towards said guiding plane for engagement with the pulling beam. Such a sunshade assembly is known from EP-A-1.112.876.

In an inoperative (fully opened) position of a known previous type of such a sunshade assembly the sunshade screen is fully wound on the spring-loaded winding cylinder. When the sunshade screen has to be positioned in an operative (fully opened) position, the pulling beam is manually gripped and moved away from the spring-loaded winding cylinder which then unwinds the flexible sunshade screen. In the desired position of the sunshade screen the pulling beam is locked to the guides. A sunshade assembly of this previous known type generally has two positions, i.e. a fully opened position (sunshade screen fully wound on the winding cylinder) and a fully closed position (sunshade screen fully wound off the winding cylinder). The fully opened position will be defined by abutment elements against which the pulling beam abuts; the fully closed position is defined by a locking mechanism engaging the pulling beam.

The sunshade assembly discussed above has a number of drawbacks. Firstly, it does not allow a positioning thereof in intermediate positions between the fully opened and fully closed position. Secondly, when moving the sunshade screen from the fully closed position towards the fully opened position, a user has to maintain a firm grasp onto the pulling beam, because elsewise the pulling beam with sunshade screen would move towards the winding cylinder in an uncontrolled manner, due to the spring load of the winding cylinder. Such an uncontrolled movement would lead to high loads and stresses, especially when the pulling beam reached its end position at the above mentioned abutment elements.

The sunshade assembly known from EP-A-1.112.876, already presented an improvement over said previously known sunshade assembly, because the at least partially flexible members engage the pulling beam, and friction between the pulling beam and flexible members will be created, which prevents the uncontrolled movement of the pulling beam and sunshade screen. Often the friction created between the at least partially flexible members and the pulling beam is sufficient to maintain the pulling beam and sunshade screen in any desired position, notwithstanding the force generated by the spring-loaded winding cylinder. However, it is also conceivable, that the friction generated between the pulling beam and the at least partially flexible members is only sufficient for preventing an uncontrolled movement of the pulling beam, but insufficient for fully stopping the movement thereof.

SUMMARY OF THE INVENTION

It is an object of the present invention to provide a still further improved sunshade assembly.

Accordingly, a sunshade assembly for use in an open roof construction for a vehicle includes a flexible sunshade screen that, with its one end, can be wound on or off a spring-loaded winding cylinder and with its other end having a transversally extending pulling beam. The sunshade assembly further includes two spaced, longitudinally extending guides each defining a guiding channel for receiving and guiding two opposite lateral ends of the pulling beam and for defining a guiding plane in which the sunshade screen extends. Both guides are provided with at least partially flexible members extending along a length of the guides and protruding towards the guiding plane for engagement with the pulling beam. The guiding channels further receive and guide two parallel lateral edges of the sunshade screen. Each at least partially flexible member has a main body with substantially U-shaped cross-section having two legs engaging a plate-shaped part of a corresponding guide at opposite sides. Attached to said main body there is provided a flexible lip protruding towards said guiding plane.

The flexible member having such a U-shaped cross-section, is easy to attach to the plate-shaped part of the guide. In particular, it can easily be slid onto said plate-shaped part. The flexible lip, which will engage the pulling beam, may be a distinct member attached to the main body, but it is also possible that the flexible lip is defined by a bent end part of one of the legs of the main body, and thus integrally formed therewith from a single unitary body.

In one embodiment, the flexible members protrude substantially into the guiding channels of the guides, thus operating very effectively.

In one embodiment, at least the flexible lip is manufactured from a flexible or resilient material, because it has to cooperate with the pulling beam. However, it is also possible, that the main body is made of a resilient material providing a clamping force, for example, wherein the resilience of the main body forces the two legs towards each other for clampingly receiving therebetween, the plate-shaped part of the guide. In such a case, mounting the at least partially flexible member to a corresponding guide is extremely simple and does not or hardly require any additional fixing devices. However, for ensuring an extremely strong connection between the at least partially flexible member and the corresponding guide, appropriate device, such as, for example, adhesive, screws, rivets or a like could be applied.

In another embodiment of the sunshade assembly according to the present invention, the at least partially flexible member is attached to a top part of the guide and protrudes downwardly in the direction of the sunshade screen. In this particular embodiment, the at least partially flexible member is positioned above the sunshade screen and pulling beam and can contribute to the prevention of the entrance of dust, rain or other foreign bodies between the guide and the sunshade screen. Further, in such an embodiment the lower leg of the guides defines a support for the pulling beam acting as a continuous guide and provides a very precise position of the pulling beam in a vertical direction. When attaching flexible members to the top part as well as the lower part (upper leg and lower leg, respectively) protruding downwardly and upwardly, respectively, such a precise positioning of the pulling beam can not be guaranteed.

More generally, the at least partially flexible member also may prevent the entrance of light between the guide and the edges of the sunshade screen.

The invention, further, relates to an open roof construction for a vehicle, provided with a sunshade assembly in accordance with the present invention.

BRIEF DESCRIPTION OF THE DRAWINGS

Hereinafter the invention will be elucidated referring to the drawings, in which embodiments of the sunshade assembly according to the present invention are illustrated.

DETAILED DESCRIPTION OF THE ILLUSTRATIVE EMBODIMENTS

Figure 1:
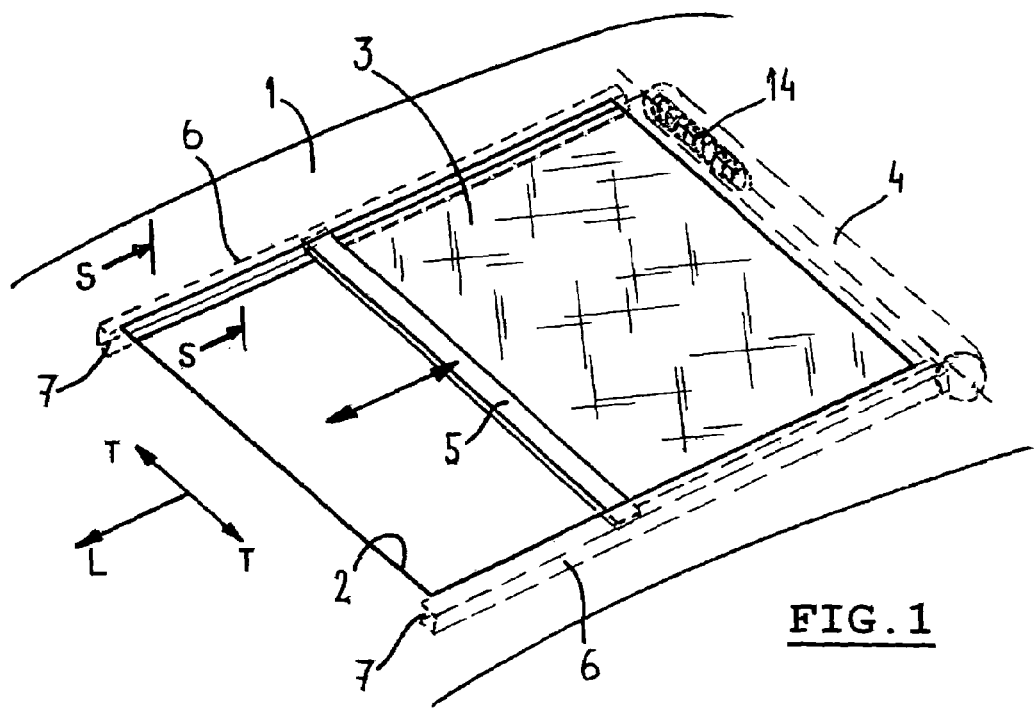
FIG. 1 illustrates, schematically a perspective view of part of a vehicle provided with an open roof construction assembly, with portions removed, and comprising a sunshade assembly in accordance with the present invention.
Figure 4:
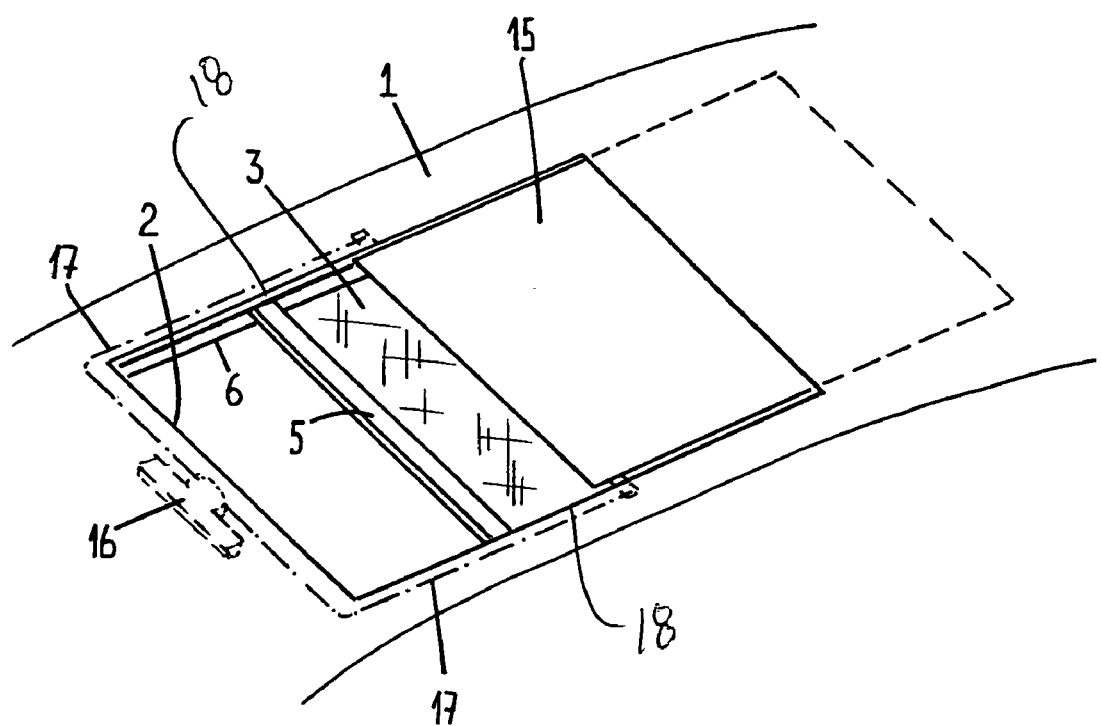
FIG. 4 illustrates, schematically a perspective view of part of a vehicle provided with an open roof construction assembly comprising a sunshade assembly in accordance with the present invention.

Referring first to FIG. 1, part of a roof 1 of a vehicle is shown, in which an open roof construction assembly with a roof opening 2 is provided. As shown schematically in FIG. 4, said roof opening 2 can be closed and opened by a closure mechanism comprising at least a movable panel 15 adapted for guided movement on guides 18 attached to or formed in the fixed roof 1 and driven by a driving mechanism 16 (e.g. an electric motor or hand crank) through cables 17. The movable panel 15 is movable in a longitudinal direction "L" of the vehicle. It is noted, that in FIG. 1 the movable panel 15 has been omitted for the sake of clarity. Such an open roof construction assembly further comprises, as illustrated, a flexible sunshade screen 3 that, with its one end (rearward end as seen in the longitudinal direction L) can be wound on or off a spring-loaded winding cylinder 4. The other end (forward end) of the flexible sunshade screen 3 comprises a pulling beam 5 which extends in the transversal direction "T" of the vehicle. Further the illustrated open roof construction and sunshade assembly includes two spaced, longitudinally extending guides 6 each defining a guiding channel 7 for receiving and guiding two parallel lateral edges of the sunshade screen 3 and two opposite lateral ends of the pulling beam 5. These guides 6 further define a guiding plane 15 in which the sunshade screen 3 (and pulling beam 5 thereof) extends.

Figure 2:
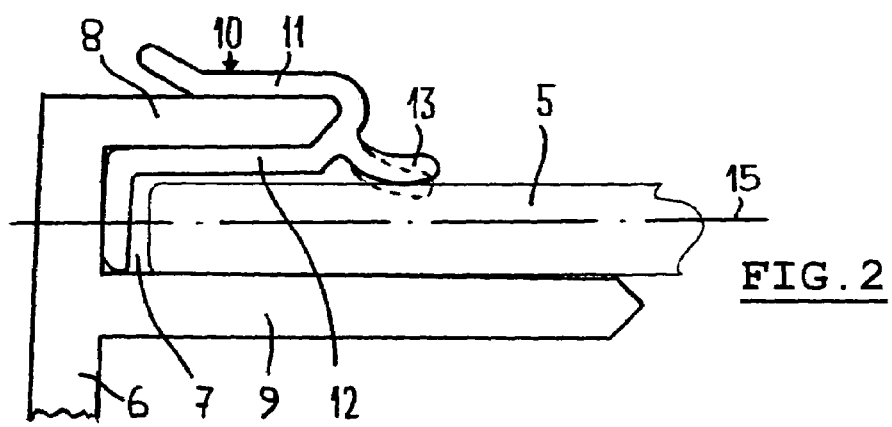
FIG. 2 illustrates, on a larger scale, a cross-section according to S—S in FIG. 1 in a first embodiment.

Now referring to FIG. 2, on a larger scale a cross-section according to S—S in FIG. 1 is illustrated, showing a first embodiment of the present invention. Guide 6 comprises an upper plate-shaped part 8 and lower plate-shaped part 9 which together define the guiding channel 7 therebetween. As is clearly visible, a lateral end of the pulling beam 5 is received in said guiding channel 7.

An at least partially flexible member has a main body 10 with substantially U-shaped cross-section comprising two legs 11 and 12 engaging the upper plate-shaped part 8 of the guide 6 at opposite sides. Attached to said U-shaped main body 10 is a flexible lip 13 which protrudes towards the guiding plane 15, and in the embodiment shown substantially into the guiding channel 7 of the guide 6.

Figure 3:
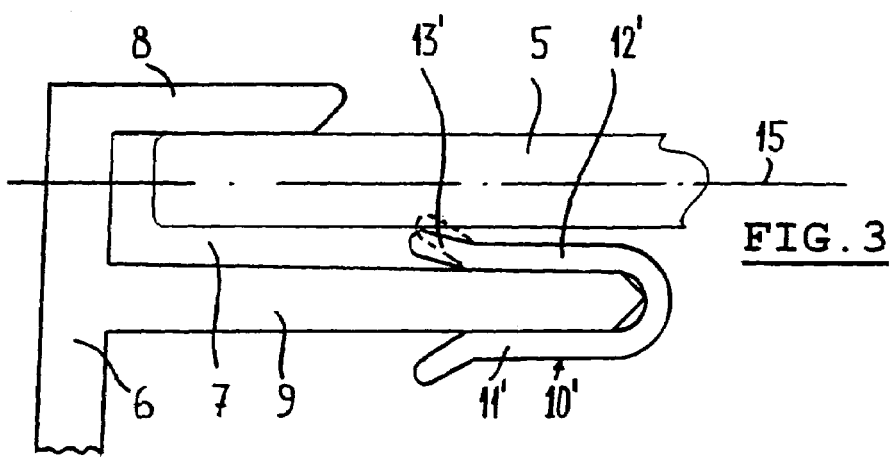
FIG. 3 illustrates, on a larger scale, a cross-section according to S—S in FIG. 1 in a second embodiment.

The flexible member extends, preferably, along substantially the entire length of the guides 6 (in FIG. 2 and FIG. 3 perpendicularly to the drawing). This means, that at any moment only a small part of its flexible lip 13 will engage the pulling beam 5, namely that lengthwise part of the flexible lip 13 at which at a certain moment the pulling beam 5 is located. At such a location the flexible lip 13 will have the position as indicated in FIG. 2 in full lines to engage and hold the pulley beam 5 in a fixed position due to a clamping force created thereby. At other locations, the flexible lip 13 will substantially have a position as indicated in dotted lines in FIG. 2 due to the resilient nature of flexible lip 13 to return to the position indicated in the dotted lines.

Although in FIG. 2 the flexible lip 13 in its position not engaging the pulling beam 5 extends downwardly and away from the inner base of the guiding channel 7, it also could extend downwardly and towards the inner base of the guiding channel 7. The flexible lip 13 generates a friction force on the pulling beam 5, such that no uncontrolled movement thereof will occur, for example when a user does not firmly grasp the pulling beam 5, while moving it from a fully closed position towards a fully opened position (in FIG. 1 from left to right). Such an uncontrolled movement could otherwise occur under influence of a spring member 14 (FIG. 1) spring-loading the winding cylinder 4.

Basically, only lip 13 has to be flexible. However, the main body 10 itself also can be manufactured from a resilient material, such that the two legs 11 and 12 clampingly receive therebetween the plate-shaped part 8 of the guide 6.

For further enhancing the connection between the main body 10 and plate-shaped part 8 of the guide 6, additional fixing devices may be provided, such as, for example, adhesive, screw, rivets or a like (not illustrated).

FIG. 3 shows an alternative embodiment of the sunshade assembly according to the present invention. In this particular embodiment a U-shaped main body 10' comprises legs 11' and 12' receiving therebetween, the lower plate-shaped part 9 of the guide 6. The upper leg 12' of said main body 10' defines at its outer end a flexible lip 13' which functions in a manner corresponding to the flexible lip 13 of the embodiment according to FIG. 2.

Of course, it is also possible that flexible members in accordance with the present invention are provided at the upper plate-shaped part 8 as well as the lower plate-shaped part 9 of the guide 6.

When the friction produced by the flexible member is large enough, the pulling beam 5 (and flexible sunshade screen 3) can be positioned in any desired position between the fully closed and fully opened position. Further, the flexible lips 13 and/or 13' prevent undesired vibrations of the pulling beam 5 within the guiding channels 7 (which would produce disturbing noises). Finally, the flexible lips 13 and/or 13' can prevent the entrance of dust, rain or other foreign objects between the guide 6 and the pulling beam 5 and/or flexible sunshade screen 3.

The present invention provides a sunshade assembly which is easier to manufacture, which costs less and of which the constructive complexity is reduced.

The present invention is not limited to the embodiments described before, which may be varied widely within the scope of the invention as defined by the appending claims.

What is claimed is:

1. A sunshade assembly for use in an open roof construction for a vehicle, comprising a flexible sunshade screen that, with its one end, can be wound on or off a spring-loaded winding cylinder and that at its other end comprises a transversally extending pulling beam having a first side and a second side opposite the first side, and further comprising two spaced, longitudinally extending guides each defining a guiding channel for receiving and guiding two opposite lateral ends of the pulling beam and for defining a guiding plane in which the sunshade screen extends, wherein both guides are provided with legs for engagement with the first side of the pulling beam and at least partially flexible members extending along a length of the guides and protruding towards said guiding plane for engagement with the second side of the pulling beam, wherein the guiding channels further receive and guide two parallel lateral edges of the sunshade screen and wherein each at least partially flexible member has a main body with substantially U-shaped cross-section comprising two legs engaging a plate-shaped part of a corresponding guide at opposite sides, and wherein attached to said main body there is provided a flexible lip protruding towards said guiding plane such that the legs engage the first side of the pulling beam and the flexible lip engages the second side of the pulling beam.

2. The sunshade assembly according to claim 1, wherein the main body is made of a resilient material and wherein the resilience of the main body forces the two legs towards each other for clampingly receiving therebetween the plate-shaped part of the guide.

3. The sunshade assembly according to claim 2, wherein the flexible members protrude substantially into the guiding channels of the guides.

4. The sunshade assembly according to claim 3, wherein the at least partially flexible member is attached to a top part of the guide and protrudes downwardly in the direction of the sunshade screen.

5. The sunshade assembly according to claim 1, wherein the flexible members protrude substantially into the guiding channels of the guides.

6. The sunshade assembly according to claim 5, wherein the at least partially flexible member is attached to a top part of the guide and protrudes downwardly in the direction of the sunshade screen.

7. The sunshade assembly according to claim 1, wherein the at least partially flexible member is attached to a top part of the guide and protrudes downwardly in the direction of the sunshade screen.

8. An open roof construction assembly for a vehicle adapted for opening and closing an opening in a fixed roof of a vehicle, the open roof construction assembly comprising: a panel adapted for opening and closing the roof opening; and a sunshade assembly disposed below the panel and having a flexible sunshade screen that, with its one end, can be wound on or off a spring-loaded winding cylinder and that at its other end comprises a transversally extending pulling beam having a first side and a second side opposite the first side, and further comprising two spaced, longitudinally extending guides each defining a guiding channel for receiving and guiding two opposite lateral ends of the pulling beam and for defining a guiding plane in which the sunshade screen extends, wherein both guides are provided with legs for engagement with the first side of the pulling beam and at least partially flexible members extending along a length of the guides and protruding towards said guiding plane for engagement with the second side of the pulling beam, wherein the guiding channels further receive and guide two parallel lateral edges of the sunshade screen and wherein each at least partially flexible member has a main body with substantially U-shaped cross-section comprising two legs engaging a plate-shaped part of a corresponding guide at opposite sides, and wherein attached to said main body there is provided a flexible lip protruding towards said guiding plane such that the legs engage the first side of the pulling beam and the flexible lip engages the second side of the pulling beam.

9. The open roof construction assembly according to claim 8, wherein the main body is made of a resilient material and wherein the resilience of the main body forces the two legs towards each other for clampingly receiving therebetween the plate-shaped part of the guide.

10. The open roof construction assembly according to claim 9, wherein the flexible members protrude substantially into the guiding channels of the guides.

11. The open roof construction assembly according to claim 10, wherein the at least partially flexible member is attached to a top part of the guide and protrudes downwardly in the direction of the sunshade screen.

12. The open roof construction assembly according to claim 8, wherein the flexible members protrude substantially into the guiding channels of the guides.

13. The open roof construction assembly according to claim 12, wherein the at least partially flexible member is attached to a top part of the guide and protrudes downwardly in the direction of the sunshade screen.

14. The open roof construction assembly according to claim 8, wherein the at least partially flexible member is attached to a top part of the guide and protrudes downwardly in the direction of the sunshade screen.

* * * * *